(12) United States Patent
Patel et al.

(10) Patent No.: US 9,537,870 B2
(45) Date of Patent: Jan. 3, 2017

(54) DETECTING UNAUTHORIZED DEVICES

(71) Applicant: Comcast Cable Communications, LLC, Philadelphia, PA (US)

(72) Inventors: Mehul S. Patel, Centennial, CO (US); Edward David Monnerat, Highlands Ranch, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 50 days.

(21) Appl. No.: 14/250,437

(22) Filed: Apr. 11, 2014

(65) Prior Publication Data

US 2015/0295940 A1    Oct. 15, 2015

(51) Int. Cl.
| | |
|---|---|
| *G06F 17/30* | (2006.01) |
| *H04N 7/16* | (2011.01) |
| *H04L 29/06* | (2006.01) |
| *H04L 29/08* | (2006.01) |
| *G06F 11/30* | (2006.01) |

(52) U.S. Cl.
CPC ............. *H04L 63/107* (2013.01); *H04L 67/18* (2013.01); *H04L 63/1466* (2013.01)

(58) Field of Classification Search
CPC .. G06F 21/10; G06F 21/6218; H04L 63/0428; H04L 63/08
USPC ......... 713/168–174, 182–186, 202; 709/206, 709/225, 229, 249, 389; 726/2–8
See application file for complete search history.

(56) References Cited

U.S. PATENT DOCUMENTS

| | | | |
|---|---|---|---|
| 2014/0189808 A1* | 7/2014 | Mahaffey | H04L 63/0853 726/4 |
| 2015/0113620 A1* | 4/2015 | Brewer | H04W 12/06 726/7 |

* cited by examiner

*Primary Examiner* — Evans Desrosiers
(74) *Attorney, Agent, or Firm* — Banner & Witcoff, Ltd.

(57) ABSTRACT

Methods and systems are disclosed that, in some aspects, provide for receiving a provisioning request from a requesting device, and identifying one or more other devices proximate to or co-located with the requesting device. The methods and systems may include determining a location and other information of the one or more other devices and using the information to determine a location of and other information related to the requesting device. It may be determined whether to grant the provisioning request based on the determined location of the requesting device.

17 Claims, 5 Drawing Sheets

DETECTING UNAUTHORIZED DEVICES

BACKGROUND

Network access providers typically only allow network access to authorized devices, and detecting unauthorized devices is an important component of managing such a network. However, detecting unauthorized devices is often challenging. Hackers and thieves may manipulate devices to give the appearance of being an authorized device, and detecting this type of manipulation is difficult. There remains an ever-present need to more effectively identify unauthorized devices in a network.

SUMMARY

The following summary is for illustrative purposes only, and is not intended to limit or constrain the detailed description.

Some features herein relate to detecting and identifying unauthorized devices in a first network by relying on assistance from authorized devices on a second network to infer a location of a suspect device, and to then use that inferred location to determine whether the suspect device is an authorized device.

The assistance from the authorized devices may come in a variety of ways. For example, the authorized devices may be connected to a local network (e.g., a MoCA in-home coaxial cable network, an Ethernet network, a Wi-Fi network, a fiber network or a combination thereof, etc.), and may be configured to detect when a new device is connected to one or more networks associated with the authorized devices. When such a new device is detected, the one or more authorized devices may be configured to communicate with the new device to exchange information with the new device. The exchanged information may comprise device identification information (e.g., device identification information such as Media Access Control—MAC—addresses, serial numbers, etc.), account identification information (e.g., user identification information, account number, etc.), and any other desired type of identifying information. After exchanging the information with the new device, the authorized device(s) may transmit the information. For example, a report may be sent to an administrator that is responsible for controlling access to a network, wherein the report may include information obtained from the new device, as well as information identifying the authorized device sending the report. The administrator may determine a location of the new device by determining a location associated with the authorized device (e.g., which may be indicated in account information for the authorized device), and then use the determined location to determine whether the new device should be authorized for network access. Similar and other information may be gathered from other authorized or known device.

Alternatively, the assistance can come from the mere act of the authorized devices exchanging their information with the new device. In such embodiments, the new device may be configured to connect to one or more local networks, receive information from other authorized devices on the local network(s), and then include some or all of the information in a provisioning request sent from the new device to an administrator of a network when requesting authorization to access the external network.

The network administrator may receive information from the various authorized devices, and may examine the information to identify the authorized devices that sent the reports. Those devices may be associated with an account with the network administrator, and the administrator may be able to retrieve account information to determine a location of the authorized devices. With that location known, the administrator may then infer that the new device is at the same location (or within a range that is dependent on the type of local network—e.g., Wi-Fi range, MoCA range, etc.), and may then determine whether network access at that location is supposed to occur. For example, the network administrator may receive a report from a user's smartphone or tablet computer, reporting that a co-located modem is active. Devices may be co-located if they are in or at the same premises or in proximity to one another. The network administrator may then consult account information for the user's tablet computer, and determine whether that account is associated with an approved modem. If that account is not associated with an approved modem, then the administrator may flag the modem as possibly being an unauthorized device that is wrongfully receiving data service on the administrator's network.

As noted above, the new device may also include information regarding the authorized devices when the new device requests provisioning or otherwise communicates with or knows of the authorized devices. When the network administrator receives this provisioning request, the administrator may similarly consult the information regarding the authorized devices, and check to determine whether the authorized devices are associated with an account that permits modem access to the administrator's network.

Accordingly, one or more aspects of the disclosure provide for a method that may include receiving, by a computing device, a provisioning request from a requesting device, identifying one or more other devices in proximity with the requesting device, and determining one or more locations corresponding to the one or more other devices. The method may further include using the determination of the one or more locations to determine a location of the requesting device, and determining a response to the provisioning request based on the determined location of the requesting device.

One or more aspects of the disclosure also provide for a method that may include connecting a computing device to a local network different from an external network. The method may further include identifying one or more other devices that are proximate to the computing device, and exchanging identification information between the computing device and the one or more other devices, and transmitting, from the computing device, a provisioning request for service on the external network, wherein the provisioning request comprises information identifying the one or more other devices.

One or more aspects of the disclosure also provide for a method that may include receiving a communication from a network access computing device, the communication containing information from a local device connected with the network access computing device, determining whether the network access computing device and the local device are associated with a same account, and using a result of the determination to determine whether network access is authorized.

The summary here is not an exhaustive listing of the novel features described herein, and is not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
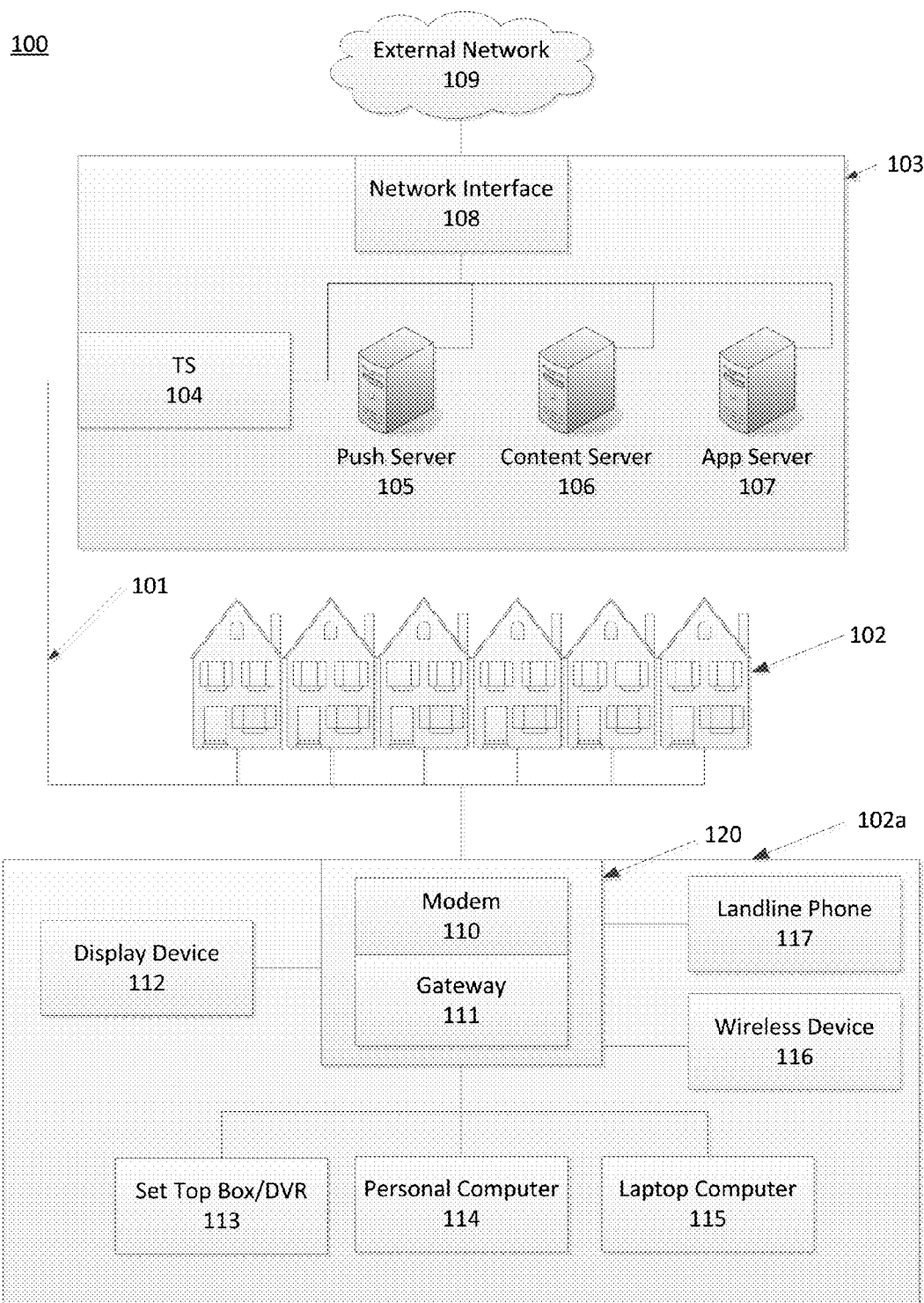
FIG. 1 illustrates an example communication network on which various features described herein may be used.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths.

The local office 103 may include an interface, such as a termination system (TS) 104. More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem (s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
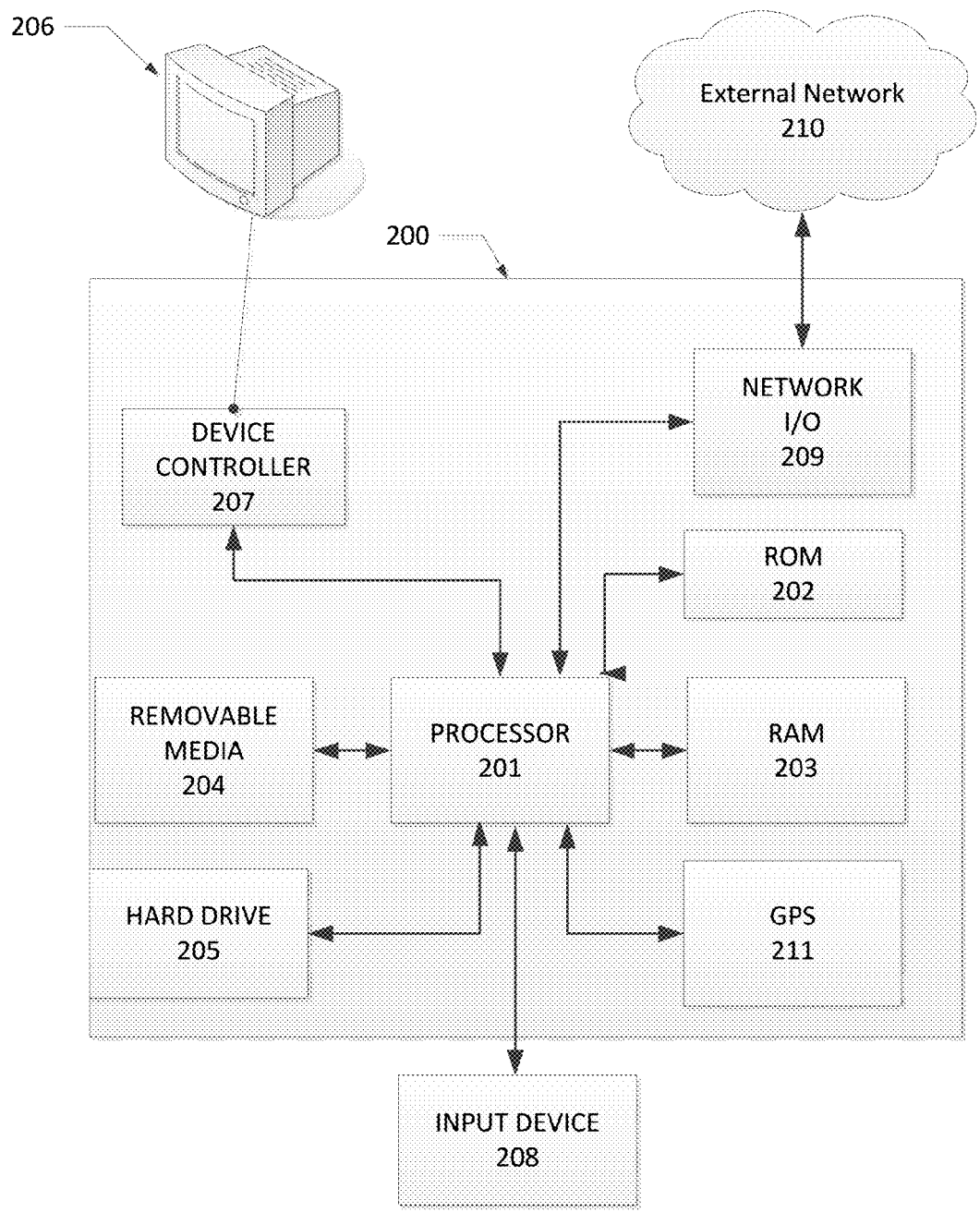
FIG. 2 illustrates an example computing device that can be used to implement any of the methods, servers, entities, and computing devices described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

The FIG. 2 example is a hardware configuration, although the illustrated components may be implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3:
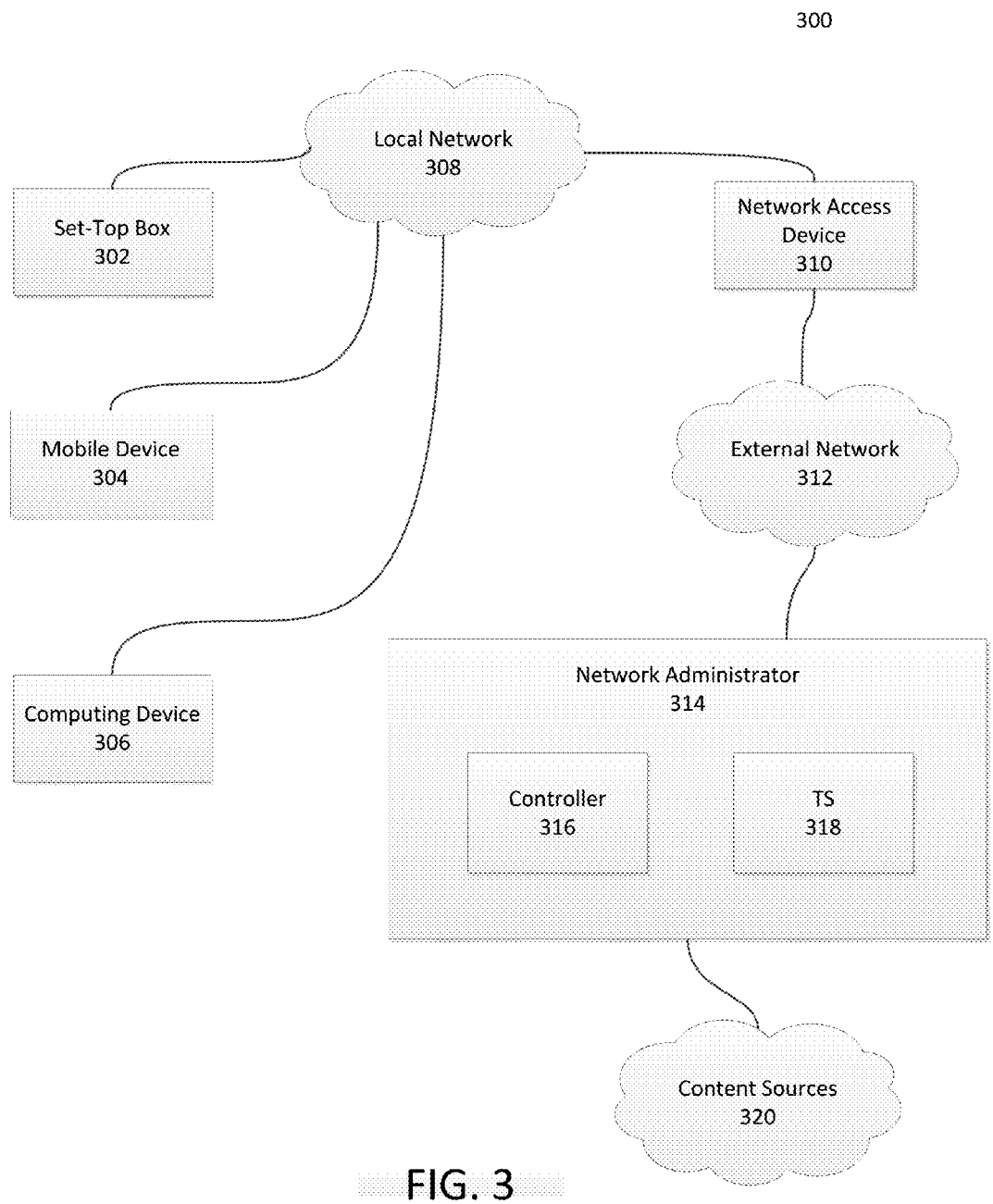
FIG. 3 illustrates an example system in accordance with aspects of the present disclosure.

FIG. 3 illustrates an example system 300 in accordance with one or more disclosed features described herein. System 300 may include a set-top box 302, mobile device 304, and computing device 306, each of which may be operably connected to local network 308. Set-top box 302 may be similar to gateway 111, and may provide services, such as video on demand, DVR, linear video, internet services, music services and the like. Mobile device 304 may be, for example, a smart phone, tablet, watch, and/or other content device. Computing device 306 may be any other computing device, such as a personal computer, laptop, and the like. Local network 308 may be similar to network 100 and/or link 101, and may be, for example, wireless, a MoCA in-home coaxial cable network, an Ethernet network, a Wi-Fi network, and the like. Local network 308 may be operably connected to and/or established by network access device 310. Network access device 310 may be similar to modem 110. Network access device 310 may be operably connected to a network administrator 314 via external network 312. External network 312 may be similar to network 100 and/or link 101. Network administrator 314 may be similar to local office 103, and may be associated with and/or include controller 316 and termination system (TS) 318. Network administrator 314 may be, for example, a content, media, and/or internet service provider. Network administrator 314 may also be associated with, for example, a head end. Controller 316 may control service, such as content service, provided by network administrator 314. TS 318 may be similar to or the same as termination system 104. Network administrator 314 may access and retrieve content from one or more content sources 320, such as the internet content sources or video content sources, for transmission to one or more devices. Set-top box 302, mobile device 304, and computing device 306 may be connected to external network 312 and/or to network administrator 314, and such connection may be provided by a network access device, such as network access device 310. In some embodiments, set-top box 302, mobile device 304, and computing device 306 may exchange data with controller 316. Network access device 310 may be connected to and/or exchange data with controller 316 and/or TS 318 via external network 312. System 300 may be associated with and/or located at example premises 102a. Alternatively or additionally, system 300 may be associated with and/or located at one or more premises 102.

In one example, a modem, which may be an example of network access device 310, and a customer premise equipment device such as a set-top box located at a location, such as premises 102a, may communicate with the head end of a service provider, such as network administrator 314, over a network, such as external network 312. The modem may use known initializing and provisioning techniques to obtain a network address and establish a connection to the provider network. For example, the data-over-cable service interface specifications (DOCSIS) specify various protocols for managing the connection of a modem to a termination system (TS), such as TS 318, which may be associated with the head end. The modem may obtain an IP address in a known manner, and customer premise equipment connected to the external network 312 through the modem may obtain an IP address, for example, by utilizing a networking protocol, such as Dynamic Host Configuration Protocol (DHCP).

During provisioning of a modem, the modem connection to the TS is initialized, the modem is provided with a network address, and the modem receives a modem configuration file from a network server. The configuration file contains service provisioning information. In order to configure services, the modem passes certain contents of the configuration file to the TS, and the TS passes certain identifiers back to the modem. The provisioning allows the network access device (e.g., the modem) to communicate with the TS and obtain data service from the TS.

A service provider may restrict or limit access to the service provider's network of a modem until the service provider validates the modem through a provisioning process. In one approach, the service provider maintains a list of hardware addresses or locations for validated modems and other devices. When a modem or other device attempts to initialize, and if the hardware address is in the list of valid modem hardware addresses, the modem is allowed normal access to network resources. In the case where a modem has yet to be provisioned, a restricted environment may be provided for the modem.

According to some aspects disclosed herein, other devices, such as set-top box 302, mobile device 304, computing device 306, and network access device 310 may assist with provisioning of the modem and may be able to send information identifying themselves to network administrator 314, and the network administrator 314 may determine that the devices are co-located with the modem, and may further determine the geographic location of those devices. The location may be determined by using information (such as account information and/or location information) previously stored regarding the devices. Thereafter, when a new requesting device is undergoing registration and/or provisioning to connect to an external network from that same geographic location, the other co-located devices may assist in that provisioning process by, for example, reporting that the other co-located devices have also detected the new requesting device via a local communication network. The controller (e.g., controller 316) of the external network (e.g., external network 312) may then infer that the new requesting device is co-located with those other devices, and may identify an account at that location, and use that account for the provisioning.

Figure 4:
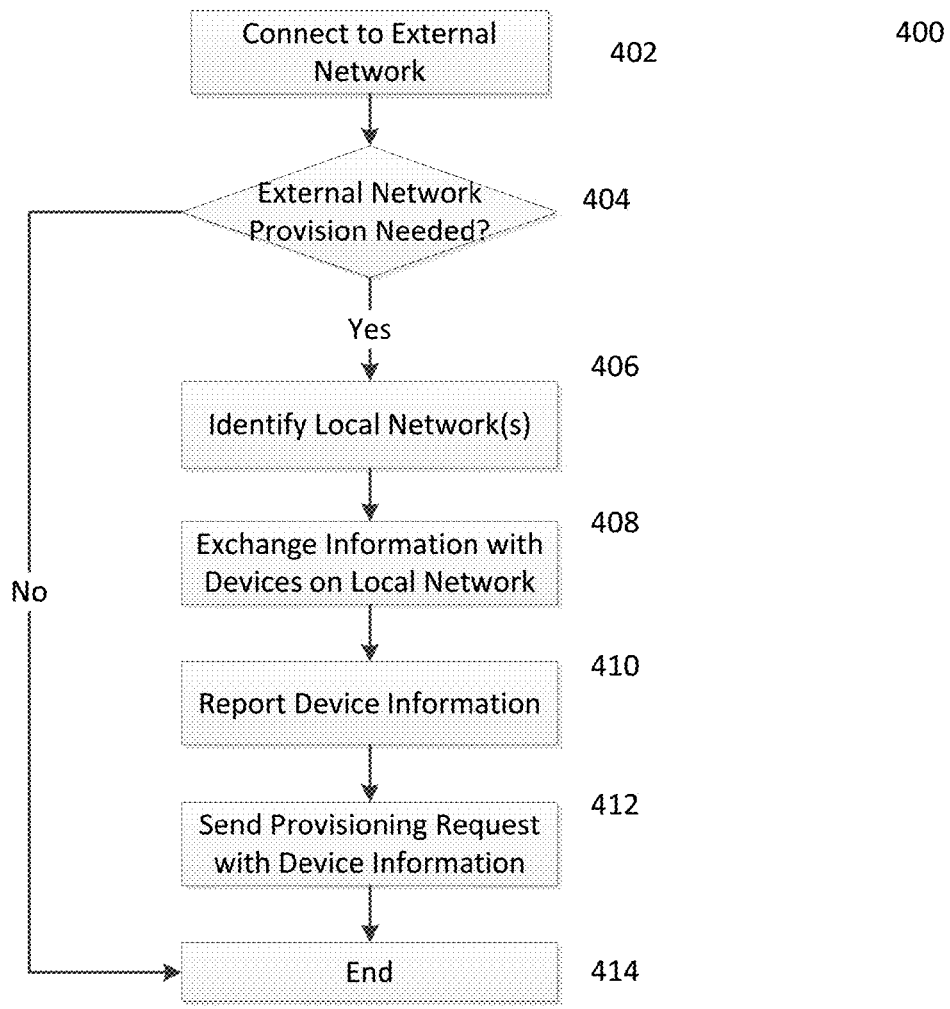
FIG. 4 illustrates an example flow diagram of a method in accordance with aspects of the present disclosure.

FIG. 4 is an exemplary flow diagram illustrating an example process 400 in accordance with one or more disclosed features described herein. In one or more embodiments, the process illustrated in FIG. 4 and/or one or more steps thereof may be performed by one or more computing devices (e.g., set-top box 302, mobile device 304, computing device 306, network device 310, and the like). In other embodiments, the process illustrated in FIG. 4 and/or one or more steps thereof may be embodied in computer-executable instructions that are stored in a computer-readable medium, such as a non-transitory computer-readable memory. The steps in this flow diagram need not all be performed in the order specified and some steps may be omitted and/or changed in order.

In the example provided, process 400 may begin with step 402, in which one or more devices, such as set-top box 302, mobile device 304, computing device 306, network device 310, and the like may connect with a managed network, such as a network associated with a network administrator or content provider (e.g., external network 312). For example, after a user obtains network device 310 (e.g., a new modem) and connects it at premises 102a, the network device 310 may connect or try to connect to external network 312, which may be connected to network administrator 314. The user may desire to retrieve or access content managed by network administrator 314 using network device 310. According to some embodiments, network device 310 may need to be provisioned before receiving content from network administrator 314 for access by one or more devices connected to network device 310. However, network device 310 may or may not be already provisioned by network administrator 314. In some aspects, a service provider, such as network administrator 314, may restrict or limit access to a network associated with the service provider, such as external network 312, by a device requesting network access, such as network device 310 or other device. Thus, until the service provider validates the device requesting network access through a provisioning process, the device requesting network access may have substantially little to no access to the network and/or network resources associated with the service provider. In one example, the service provider maintains a list of hardware addresses for validated devices, such as modems, termination points, or other devices. Thus, after a device, such as a modem or other device, attempts to initialize and/or access a network associated with a service provider, the device may be allowed normal access to service provider network resources if the device's hardware address (or other identifying information) is found, for example, in the list of valid device hardware addresses (or other identifying information).

In the case where a device has yet to be provisioned, a restricted environment may be provided for the device (e.g., modem), which may be referred to as a walled garden. In one example, the restricted environment involves providing to a non-provisioned device a special configuration file which restricts network access of the non-provisioned device. After the device requests provisioning of, for example, a network associated with a service provider, and if approved by the service provider by, for example, agreeing on parameters for how the device will access the network associated with the service provider, the device may then receive a configuration file that may allow the device access to the network provider's network as opposed to a configuration file that keeps the modem within the walled garden.

At step 404, it is determined by, for example, network administrator 314 whether the device connected to external network 312, such as network device 310 (e.g., a modem), needs to be provisioned by network administrator (e.g., by TS 318). In some embodiments, this determination may alternatively or additionally be aided or made by other devices, such as network device 310, set-top box 302, mobile device 304, or computing device 306, using, for example, a location or account associated with one of these devices. In some embodiments, network device 310 may already be provisioned by network administrator 314, and thus may not be restricted access to network resources associated with network administrator 314. However, if network device 310 is not provisioned, then the network administrator 314 may restrict network device 310's access to network resources associated with network administrator 314. It is noted that network device 310 (e.g., a modem) is used hereinabove and hereinafter as merely an example, and other devices may be used according to disclosed aspects. If it is determined at step 404 that the requesting device does not need to be provisioned on the external network, then process 400 may end at step 414. If it is determined at step 404 that the requesting device needs to be provisioned on the external network, then process 400 continues to step 406.

At step 406, the network device 310 may identify one or more other local networks, such as local network 308, which may be supported by the device 310. For example, network device 310 may be a modem with a built-in wireless router that can provide a local wireless network. That local wireless network may be local network 308, and other devices, which may be located at premises 102*a*, may be connected to local network 308. These other devices may include, for example, devices similar to and/or substantially the same as set-top box 302, mobile device 304, computing device 306, and the like. In some embodiments, network device 310 may enable local network 308, and one or more devices, such as set-top box 302, mobile device 304, computing device 306, may access and/or connect to external network 312 and/or network administrator 314 via local network 308 and network device 310.

At step 408, device identification information may be exchanged and/or transmitted between one or more devices connected to a local network, such as local network 308, so that the various devices on the local network 308 are made aware of the various other devices on the local network 308. These devices may include, for example, set-top box 302, mobile device 304, computing device 306, and network device 310. The exchanged device identification information may include credential information, such as information identifying one or more accounts associated with network administrator 314. As stated above, any credential information, such as lists of accounts, location, approved devices, and the like, may be kept and maintained by network administrator 314. For example, network administrator 314 may have a list of approved and/or registered devices. This list may be generated based on information acquired by network administrator 314 from customers and/or devices, or through any other methods. Alternatively, credential information may be kept, maintained, and/or provided by other devices or entities. An account may be, for example, associated with one or more people that may reside at premises 102*a*. The account may have one or more devices associated or affiliated with it. Additionally, the account may be associated with a location for services provided by network administrator 314, which may include an address for any person, device, or premises associated with the account. For example, a family may have an account for services provided by network administrator 314. The family may have 5 devices, such as 3 set-top boxes, a mobile device, and a computing device, registered and/or associated with the account. The account may also associate the family's residence address or location with one or more of their devices. Additionally, credential information may include a MAC address for one or more of the devices connected to local network 308. Thus, at step 408, the various co-located devices may use local network 308 to exchange their respective credential information, and as a result, those co-located devices may become aware of the other devices on the local network 308 (including the newly added network device 310).

In some embodiments, one or more networks connected to the requesting device, such as local network 308 and/or external network 312 may be used to determine the location and/or account associated with the device. Additionally or alternatively, an associated location may be determined using a GPS location of a device, which may be provided by a GPS device, such as GPS 111. In some embodiments, information exchanged between devices, such as set-top box 302, mobile device 304, computing device 306, and network device 310, may include location information, such as GPS location information, street address, location in a premises (e.g., kitchen, bedroom, personal office, and the like).

At step 410, the one or more devices connected to the local network may then report via, for example, network device 310 and external network 312, any information, such as the credential information gathered in step 408 from the one or more devices connected local network 308, to controller 316, which may be associated with and/or located at network administrator 314. In some embodiments, information may be reported via other devices and/or transport channels. For example, a smartphone may use a cellular data connection (e.g., 3G, 4G, LTE, etc.) to report information to the network administrator 314. Other ways of reporting data may include, for example, a satellite network, a telephonic network, a wireless network, optical fiber network, a coaxial cable network, or a hybrid fiber/coax distribution network. The reporting of this information may also be done through messages sent from the one or more devices connected to local network 308. Alternatively, the one or more devices connected to local network 308 may be programmed to automatically send the credential information to network administrator 314. The one or more devices connected to local network 308 may send the credential information via a network access device, such as network device 310, which may be connected to external network 312. The credential information may include, for example, serial number information, account information, and/or location information associated with the one or more devices. Network administrator 314 may then associate the location and/or account information associated with the one or more devices with the provisioning requesting device. Thus, a location of the provisioning requesting device may be determined based on the location and/or account information of the one or more devices connected to local network 308. Also, the one or more devices may send information detailing whether or not the provisioning requesting device needs to be provisioned, and any other information relating to the provisioning requesting device. Alternatively or additionally, network administrator 314 may use the provided information to determine whether any accounts associated with the one or more devices connected to the local network may also be associated with and/or authorized to use the provisioning requesting device. This determination may be made by, for example, controller 316.

At step 412, the provisioning requesting device may then report, along with a provisioning request, any information, such as the information gathered in step 408 or reported in step 410, to, for example, TS 318, which may be associated with and/or located at network administrator 314, via external network 312. This information may be used in the registration/provisioning process of the requesting device. The information may include credential information that may, for example, identify any device connected to local network 308 and/or co-located with the requesting device. For example, the information may be used to help determine, for example, a location of the requesting device and may be based on the location and/or account information of one or more devices connected to local network 308. Based on any of the received information, such as provided in step 410 and/or step 412, network administrator 314 may or may not then register/provision the requesting device. Process 400 may then end at step 414.

Figure 5:
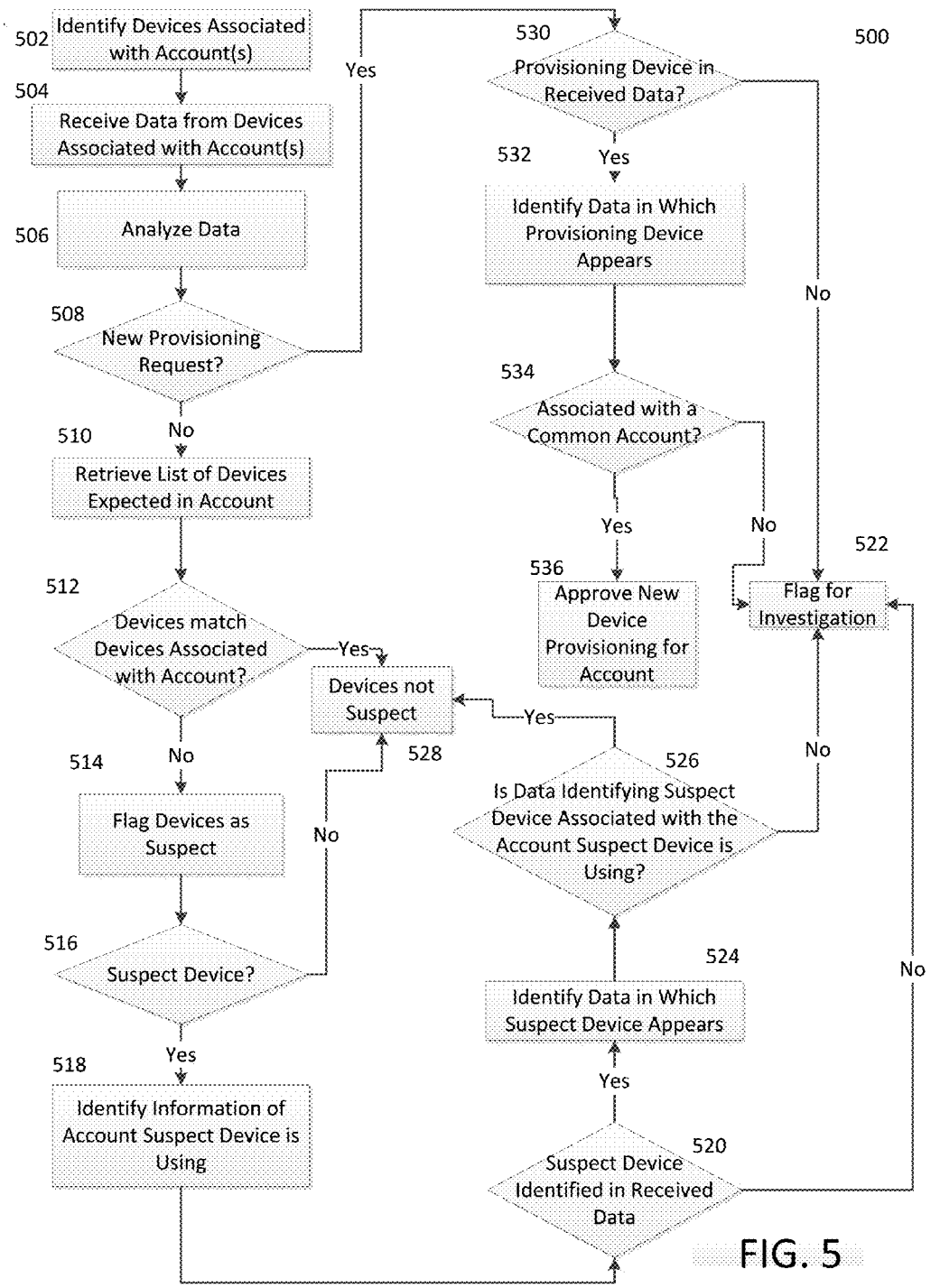
FIG. 5 illustrates an example flow diagram of a method in accordance with aspects of the present disclosure.

FIG. 5 is an exemplary flow diagram illustrating an example process 500 in accordance with one or more disclosed features described herein. In one or more embodiments, the process illustrated in FIG. 5 and/or one or more steps thereof may be performed or implemented by, for example, network administrator 314 and/or one or more computing devices (e.g., set-top box 302, mobile device 304, computing device 306, network device 310, and the like) via, for example, local network 308 and/or external network 312. In other embodiments, the process illustrated in FIG. 5 and/or one or more steps thereof may be embodied in computer-executable instructions that are stored in a computer-readable medium, such as a non-transitory computer-readable memory. The steps in this flow diagram need not all be performed in the order specified and some steps may be omitted and/or changed in order.

In the example provided, process 500 may begin with step 502, in which a service provider, such as network administrator 314 (e.g., Internet service provider), may identify one or more devices, such as set-top box 302, mobile device 304, computing device 306, network device 310 (e.g., a modem), and the like, that are known, trusted, or otherwise associated with (e.g., linked to or affiliated with) an account associated with network administrator 314. For example, a customer may have an account with a network administrator 314 for access to services provided by network administrator 314, such as data, video, audio, internet services, and the like. These devices may have been previously registered with network administrator 314, and therefore, may be associated with an account that is associated with network administrator 314. As stated above, account information may also include location information (as well as other information) of a device associated with that account.

At step 504, the devices identified by network administrator 314 may generate and send data, such as in the form of periodic or one-time report(s), to network administrator 314, as described above with respect to FIG. 4. A report that is sent from a device, such as mobile device 304, may include any information that device collected and/or exchanged with any other device (e.g., which may be co-located with mobile device 304). This information may include identification or credential information, such as account or location information, of other co-located devices. Devices may transmit these reports to network administrator 314 via, for example, external network 312. In some embodiments, these devices may automatically send reports to network administrator 314 upon detecting and exchanging information with a device detected over local network 308. In some embodiments, a device may transmit a report periodically, thus reporting at regular intervals identifying information of any devices that may be co-located with the reporting device. In additional embodiments, device may transmit a report at non-regular intervals.

In some embodiments, one or more devices, such as an unauthorized device, may refuse to exchange information with other devices. For example, a hacker's unauthorized modem may plug into the local network 308, and may attempt to request provisioning from the network administrator 314 using forged credentials. Other devices in the home may detect this hacker's modem, and report that the hacker's modem has refused to provide its information to the other devices. Thus, the other devices, which may include, for example, set-top box 302, mobile device 304, computing device 306, and network device 310, may report or send a message to network administrator 314 detailing the presence of an unauthorized refusing to exchange information device. In some situations, network administrator 314 may then deny the device refusing to exchange information access to network resources associated with network administrator 314. In some embodiments, the device refusing to exchange information may then be blacklisted by, for example, network administrator 314. In some embodiments, network administrator 314 may be able to find and associate a location for the blacklisted device using location and/or account information provided by the one or more devices co-located with the blacklisted device.

At step 506, after network administrator 314 receives reports from devices associated with accounts, network administrator 314 may then analyze, process, and/or store information from these reports. For example, after receiving a report from a device (such as mobile device 304), network administrator 314 may determine one or more accounts associated with mobile device 304 using, for example, information or device lists previously stored by network administrator 314, or alternatively, using information transmitted in the report. Additionally, after receiving a report from a device (such as mobile device 304), network administrator 314 may determine from the report the devices that may be co-located with mobile device 304. For example, because mobile device 304's report contains information about other devices co-located with mobile device 304, network administrator 304 may be able to identify, from a report transmitted by mobile device 304, these other devices (and any other device information transmitted with the report). Network administrator 314 may then store the device account information and/or the information for any of the co-located devices.

At step 508, network administrator 314 may determine whether there is a provisioning request transmitted by a device (e.g., a modem) connected to external network 312. As stated above, a service provider, such as network administrator 314, may restrict or limit access to a network resources associated with the service provider by a device requesting network access until network administrator 314 provisions or registers the device with network administrator 314. After a device has been provisioned with network administrator 314, the device may be allowed normal access to network resources associated with network administrator 314. If network administrator 314 determines that there is not a provisioning request (e.g., because the device is not requesting provisioning or network administrator 314 has already provisioned the device), then process 500 may continue to step 510. If network administrator 314 determines that there is a provisioning request transmitted by a device connected to, for example, external network 312, then process 500 may continue to step 530.

At step 510, network administrator 314 may then retrieve a list of devices expected in an account. Thus, network administrator 314 may determine, for each report, which devices are expected to be associated with the account of the device that transmitted the report (e.g., the devices are affiliated with mobile device 304's account(s)). For example, a cable television subscriber may have previously informed their cable company (e.g., network administrator 314) that the subscriber's household includes a wi-fi local network 308, and a cell phone 304. Network administrator 314 may know which devices are associated with account A by, for example, retrieving and analyzing a list of devices associated with account A (which may have been previously provisioned and/or registered by network administrator 314, and subsequently associated with account A).

At step 512, network administrator 314 determines whether any devices (e.g., co-located devices, such as a modem) identified in the report transmitted from the reporting device (e.g., mobile device 304) are not also identified as one of the devices associated with account A in, for example, a list of account associated devices maintained by network administrator 314. Network administrator 314 may make this determination by, for example, comparing a list of devices associated with the reporting device's account (e.g., account A) with the devices identified in the report transmitted by the reporting device (e.g., mobile device 304).

If it is determined at step 512 that a device identified in a report is not associated with an account associated with that reporting device, process 500 may continue to step 514. At step 514, network administrator 314 may then flag, as a suspect device, any unexpected devices in the report. A suspect device may be a first device that is identified in a report transmitted to, for example, network administrator 314, by a second device, where the network administrator 314 determines that the first device is not associated with an account associated with the second device.

If it is determined at step 512 that there were no unexpected devices in the report, process 500 may continue to step 528. At step 528, network administrator 314 may then identify the devices as being not suspect devices.

At step 516, network administrator 314 may determine whether a device connected to network administrator 314 is a suspect device. In this step, network administrator 314 may determine it is time to check and validate a device connected to its network resources. A suspect device may include a first device that is identified in a report transmitted to, for example, network administrator 314, by a second device, where the network administrator 314 determines that the first device is not associated with an account associated with the second device (such as devices identified in step 514). Additionally, a suspect device may be a device in which network administrator 314 may randomly or systematically choose or be alerted to as a suspect device. For example, network administrator 314 may perform routine or non-routine checks on devices (e.g., modems) connected to external network 312 (e.g., a network associated with network administrator 314). Thus, a device undergoing one of these checks by network administrator 314 may be classified as a suspect device. In another example, an entity, such as a user, company, and the like may alert network administrator 314 to a suspicious device for any number of reasons, such as a user noticing that the suspicious device is accessing an account of the user. In such a case, network administrator 314 may classify that suspicious device as a suspect device. If network administrator 304 identifies a device as not being suspect, then the process continues to step 528. If network administrator 304 identifies a device as being suspect, then process 500 continues to step 518.

At step 518, network administrator 314 may identify information of an account for which a suspect device may be using. Account information may include to which accounts the suspect device may be using to try to access external network 312 (e.g., a network associated with network administrator 314). For example, a suspect device may be using an account of a user without the user's permission or knowledge, and may be identifying itself using the user's account information, or spoofing a MAC address of the user's modem. In some embodiments, a suspect device may be using an account with which the suspect account is associated (e.g., accounts to which the suspect device may belong). As stated above, account information may also include other information, such location information.

At step 520, network administrator 314 may determine whether any reports, such as any of the reports transmitted in step 504, identify the suspect the device (e.g., identified as a co-located device). As stated above, these reports may be generated by devices associated with an account. Also, these reports may include information identify other devices with which the reporting device (e.g., the device that transmitted the report) exchanged information. Thus, the suspect device may be one of these devices identified in one of these reports.

If network administrator 314 determines at step 520 that the suspect device is not identified in at least one report, then process 500 continues to step 522, where the suspect device may be flagged for investigation by, for example, network administrator 314. After a device is flagged for investigation, network administrator 314 may then follow-up with the device by requesting more information from the device, such as account or subscription information, or may deny access to the flagged device. In some embodiments, network administrator 314 may send personnel to a location associated with the account being used by the suspect device to access external network 312. In such cases, the personnel may then determine whether the suspect device has, for example, a user's or network administrator 314's permission to access the account.

If network administrator 314 determines at step 520 that the suspect device is identified in at least one report, then process 500 continues to step 524. At step 524, network administrator 314 may then retrieve and analyze one or more (or all) of the reports which identify the suspect device.

At step 526, network administrator 314 may then determine whether the retrieved reports that identify the suspect device are associated with the account the suspect device is using to, for example, access external network 312 and/or network administrator 314. If network administrator 314 determines that the retrieved reports that identify the suspect device are associated with the account the suspect device is using to access external network 312 and/or network administrator 314, process 500 may continue step 528, where network administrator 314 may no longer classify the suspect device as being a suspect device. If network administrator 314 determines that the retrieved reports that identify the suspect device are not associated with the account the suspect device is using to access external network 312 and/or network administrator 314, process 500 may continue to step 522, where network administrator 314 may flag the suspect device for investigation.

In one example, mobile device 304 may be associated with an account (e.g., account A), and mobile device 304 may transmit a report to network administrator 314 identifying the suspect device (e.g., network device 310) as a co-located device. If network device 310 accesses external network 312 using account A, then network administrator 314 may retrieve a report transmitted by mobile device 304 to network administrator 314 identifying network device 310. Thus, the report is transmitted by mobile device 304 (and thus is associated with account A), and network device 310 (suspect device) is using account A to access external network 312. Thus, the report is associated with an account the suspect device is using (account A). In this scenario, process 500 may continue to step 528, where network administrator 314 may no longer classify the suspect device as being a suspect device.

In a related example, mobile device 304 may be associated with an account (e.g., account A), and mobile device 304 may transmit a report to network administrator 314 identifying the suspect device (e.g., network device 310) as a co-located device. If network device 310 accesses external network 312 using account B (and not account A), then network administrator may retrieve a report transmitted by mobile device 304 to network administrator 314 identifying network device 310. In this case, the report is not associated with an account the suspect device is using. In this scenario (and if, for example, network administrator 314 does not retrieve and analyze any other reports associated with account B and identifying network device 310) process 500 may continue to step 522, where network administrator 304 may flag the suspect device for investigation.

In another example, a user may be able to deceive network administrator 314 into concluding that a device (e.g., a modem) is associated with a particular account, even though that particular device may not be actually associated with that particular account. To perform this, a user may, for example, change a MAC or IP address of a device or log into an account associated with network administrator 314 using, for example, a password and/or login, or the like. In such a situation, a first user may trick network administrator 314 into thinking the first user's device belongs to an account of a second user. For example, a first user may use network device 310 to access a external network 312 and trick network administrator 314 into believing network device 310 is associated with a second user's account (e.g., account A). Network device 310 may connect to other devices at the first user's house, such a set-top box 302 and mobile device 304. Thus, any one of these three devices can report to network administrator 314 identifying information of the other co-located devices. Thus, after network administrator 314 receives reports from the first user's devices (e.g., reports from set-top box 302, mobile device 304, and network device 310) that identify these three devices as being co-located devices, network administrator may retrieve the account information for account A (e.g., the account the second user is wrongfully using), and determine that neither of the second user's three devices are associated with account A (e.g., not listed as belonging to account A). In that case, the second user's network device 310 may be flagged for investigation (step 522).

Additionally, the second user's devices may also report co-located devices (which do not include the first user's devices). Thus, network administrator 314 may determine that because the second user's devices are not reporting on the first user's devices, then the first user devices must be accessing account A from a different location (e.g., from the first user's house). If that different location (the first user's house) is not associated with account A, then network administrator may flag for investigation any of the devices associated with this different location.

In some embodiments, some of the reports identifying the suspect device may be associated with a first account, and some of the reports identifying the suspect device may be associated with a second account. In this situation, network administrator 314 may retrieve and analyze both the reports associated with the first account and reports associated with the second account. If the suspect device is using the first account to access external network 312, then network administrator 314 may, in some circumstances, use the reports associated with the first account to no longer classify the device as being a suspect device, even though network administrator 314 may have retrieved these other reports associated with the second account that also identify the suspect device.

In some embodiments, network administrator 314 may associate a threshold with the number of reports associated with an account for which a suspect device (e.g., modem) is identified before network administrator 314 classifies the suspect device as no longer a suspect device, or alternatively, be flagged for investigation. For example, network administrator 314 may retrieve and analyze a first set of reports associated with a first account identifying the suspect device and a second set of reports associated with a second account also identifying the suspect device. If the suspect device is using the first account to access external network 312 and/or network administrator 314, then network administrator 314 may use the reports associated with the first account to determine whether to flag the suspect device for investigation (step 522) or to no longer label the suspect device as a suspect device (step 528). In one situation, network administrator 314 may determine whether the number of reports associated with the first account and identifying the suspect device (or the number of reporting devices both sending these reports and associated with the first account) satisfies a threshold amount or number before either flagging the suspect device for investigation or no longer labeling the device as suspect. The threshold may be established by, for example, network administrator 314. This threshold may be a predetermined amount, such as four account devices or six account reports (e.g., unique devices or account reports) positively identifying the suspect device using that account. In some cases, the threshold amount may be a fixed amount (as shown above), or may dynamically change over time and/or not be a fixed amount.

In some embodiments, if the suspect device (e.g., modem) is accessing account A, the threshold may be, for example, a particular number or percentage of reports or reporting devices associated with account A that identify the suspect device measured out of a total number of reports or reporting devices associated with all (or portion thereof) accounts that also identify the suspect device. For example, a threshold may be set by network administrator 314 such that 35% of a total number of reports or reporting devices identifying a suspect device must be associated with the account the suspect device is using for the network administrator 314 to not flag the suspect device for investigation. In such a situation, if there are 100 total reports identifying the suspect device, if 40 reports (where each report may transmitted from a unique device) associated with account A, 50 reports associated with account B, and 10 reports associated with account C identify the suspect device, and if the suspect device is using account A to access external network 312, then the 35% threshold would be satisfied, and network administrator 314 may no longer classify the suspect device as a suspect device (step 528). If, however, the suspect device was using account C, then the 35% threshold would not be satisfied, and network administrator 314 may flag the suspect device for investigation.

In some embodiments, network administrator 314 may establish a hierarchy arrangement for reports depending on, for example, an identification of the device that transmitted the report, from where the report was transmitted (e.g., using location/account information and/or GPS information), or other condition. For example, network administrator 314 may establish a lower hierarchy preference for reports transmitted from mobile devices (such as smartphones, tablets, and the like) than reports transmitted by non-mobile devices (such as set-top boxes, modems, and the like). In such embodiments, network administrator 314 may give more weight to reports transmitted by a device having a higher hierarchy preference or precedence than reports transmitted by a device having a lower hierarchy when network administrator 314 determines, for example, whether to flag the suspect device for investigation (step 522) or to no longer label the suspect device as a suspect device (step 528). Additionally, at step 514, network administrator 314 may weight the flags given to devices depending on whether a device that sent the report is weighted high or low. Network administrator 314 may then use a weighted flag in determining whether a device is suspect at step 516, such as by determining whether the weighted flag satisfies a threshold for labeling a device as suspect.

For example, a user may invite a lot of friends over for a party at the user's house. Each friend may bring to the party a mobile device (such as a smartphone, smartwatch, and the like), and each of these mobile devices may be associated with an account of each friend (e.g., account B, account C, account D, etc.). Therefore, the reports generated by each of these devices may identify a lot of other devices (e.g., because each report is identifying the other co-located devices at the party, such as a user's modem and the other mobile devices). Consequently, network administrator 314 may receive a lot of reports from these devices identifying each of these other co-located devices. Thus, network administrator 314 may receive a lot of reports associated with particular accounts (e.g., reports associated with an account for each of these reporting devices—account B, account C, account D, etc.) identifying co-located devices (such as the modem using account A) that are not associated with a particular account of a reporting device. In this situation, network administrator 314 may use previously stored device identification information or may use device identification information transmitted to network administrator 314 in a report to determine that these reports were transmitted by mobile devices. Because mobile devices may have a lower hierarchy, network administrator 314 may not flag the modem using, for example, account A for investigation. If, for example, a friend of the user brought over the friend's set-top box (whose reports may have a higher preference than reports of a mobile device), and the set-top box is associated with a different account than the modem at the party, then network administrator 314 may give preference to a report generated by the set-top box, and may label the modem as suspect.

Referring back to step 508, if it is determined that there is a new provisioning request from a device (e.g., modem), process 500 may continue to step 530. At step 530, network administrator 314 may determine whether any reports, such as the reports transmitted in step 504 and analyzed in step 506, identify the device requesting provisioning. As stated above, these reports may be generated by devices associated with an account. Also, these reports may include information identify other devices with which the reporting device (e.g., the device that transmitted the report) exchanged information. Thus, the device requesting provisioning may be one of these co-located devices identified in one of these reports.

If network administrator 314 determines at step 530 that the device requesting provisioning is not identified in at least one report, then process 500 continues to step 522, where the device requesting provisioning may be flagged for investigation by, for example, network administrator 314. After a device requesting provisioning is flagged for investigation, network administrator 314 may then follow-up with the device requesting provisioning by requesting more information from the device, such as account or subscription information, or may deny access to the flagged device.

If network administrator 314 determines at step 530 that the device requesting provisioning is identified in at least one report, then process 500 continues to step 532. At step 532, network administrator 314 may then retrieve and analyze one or more (or all) of the reports which identify the device requesting provisioning.

At step 534, network administrator 314 may then determine whether the retrieved reports that identify the device requesting provisioning are associated with a common account associated with network administrator 314. If network administrator 314 determines that the retrieved reports that identify the device requesting provisioning are not associated with a common account, then process 500 continues to step 522, where the device requesting provisioning may be flagged for investigation by, for example, network administrator 314. If network administrator 314 determines that the retrieved reports that identify the device requesting provisioning are associated with a common account, then process 500 continues to step 536, where the device requesting provisioning may be provisioned by network administrator 314 for that common account.

In one example, a user may have a mobile device 304 and set-top box 302 associated with the user's account (e.g., account A) for services provided by network administrator 314 via external network 312. If the user obtains a new device, such as network device 310, from a consumer outlet (e.g., a store or shop), network device 310 may not be provisioned by network administrator 314. After the user connects network device 310 to external network 312 (e.g., tries to connect to network administrator 314 for services), network device 310 may request provisioning from network administrator 314. In such a situation, devices co-located with network device 310, such as set-top box 302 and mobile device 304 (all of which may be connected to a local network, such as local network 308, and/or connected to external network 312), may exchange information with network device 310, and may each report this information identifying network device 310 to network administrator 314. Network administrator 314 may then determine that one report is transmitted by set-top box 302, which is associated with account A, and that one report is transmitted by mobile device 304, which is associated with account A. Thus, because both set-top box 302 and mobile device 304 are associated with account A, and their reports both identify network device 310 as being a co-located device, network administrator 314 may then (automatically) provision network device 310 (step 536).

If, for example, mobile device 302 is associated with account A and set-top box 302 is associated with account B, then mobile device 302's report will be associated with account A, and set-top box 302's report will be associated with account B. Thus, when co-located network device 310 requests provisioning, network administrator 304 may not (e.g., automatically) provision network device 310, and may flag the device for investigation (step 522), and subsequently may request additional information from network device 310.

In some embodiments, as similarly described above, there may be a threshold associated with a number of reporting devices or reports, such that a particular amount of reports or reporting devices may be needed to be received by network administrator 314 before network administrator 314 provisions a device. Additionally, in some embodiments, as similarly described above, network administrator 314 may establish a hierarchy arrangement for reports depending on, for example, an identification of the device that transmitted the report, from where the report was transmitted (e.g., using location/account information and/or GPS information), or other condition.

Although example embodiments are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

What is claimed is:

1. A method comprising:
receiving, by a first computing device and from a second computing device, a provisioning request;
receiving, by the first computing device and from a third computing device, a report comprising an indication that the third computing device detected the second computing device;
determining whether the report comprises an indication that the second computing device refused to provide a credential to the third computing device;
determining a location of the third computing device;
using the determination of the location of the third computing device to determine a location of the second computing device; and
determining whether to provision the second computing device based on the location of the second computing device and the determination of whether the report comprises the indication that the second computing device refused to provide the credential to the third computing device.

2. The method of claim 1, further comprising:
determining an account associated with the third computing device; and
determining whether to provision the second computing device based on whether the account associated with the third computing device is associated with the second computing device.

3. The method of claim 1, further comprising:
determining an account associated with the third computing device; and
determining whether the account is authorized to use the second computing device.

4. The method of claim 1, further comprising:
determining an account associated with the third computing device;

determining that the account is not associated with the second computing device; and
raising an alert indicating that the second computing device is not associated with the account.

5. A method comprising:
receiving, by a computing device and from a network access computing device, a provisioning request;
receiving, by the computing device and from a local device, a report comprising an indication that the local device detected the network access computing device;
determining whether the report comprises an indication that the network access computing device refused to provide a credential to the local device;
determining whether the network access computing device and the local device are associated with a same account;
determining whether to provision the network access computing device based on whether the network access computing device and the local device are associated with the same account and whether the report comprises the indication that the network access computing device refused to provide the credential to the local device; and
in response to determining to provision the network access computing device, sending a response to the provisioning request to the network access computing device and providing a service to the local device using the network access computing device.

6. The method of claim 5, wherein the provisioning request comprises information indicating one or more other devices, and wherein the method further comprises using the information indicating the one or more other devices to determine whether to approve the provisioning request.

7. The method of claim 5, further comprising:
determining an account associated with the local device; and
determining an account indicated in the provisioning request.

8. The method of claim 5, further comprising:
determining a location of the local device; and
determining a location of the network access computing device based on the location of the local device.

9. The method of claim 8, further comprising:
determining whether to grant network access to the network access computing device based on the location of the local device.

10. The method of claim 5, further comprising:
in response to determining that the network access computing device and the local device are not associated with the same account, flagging the network access computing device as a suspect device.

11. The method of claim 5, further comprising receiving a plurality of device detection messages from a plurality of different devices associated with the same account, wherein the device detection messages each comprises information indicating a new device that has been connected to a network of the plurality of different devices.

12. The method of claim 11, further comprising using the plurality of device detection messages to indicate unauthorized network access.

13. An apparatus comprising:
a processor; and
a memory storing computer-executable instructions that, when executed by the processor, cause the apparatus to:
receive, from a first network device, a provisioning request to provide network access to a second network device;

receive, from the second network device, a report comprising information indicating devices with which the second network device has exchanged credentials;

determine whether the report comprises an indication that the first network device refused to provide a credential to the second network device;

if the report comprises the indication that the first network device refused to provide the credential to the second network device, reject the provisioning request;

if the first network device has exchanged credentials with the second network device based on the report, determine whether to grant the provisioning request; and in response to determining to grant the provisioning request, provide a service to the second network device using the first network device.

14. The apparatus of claim 13, wherein the memory stores one or more additional computer-executable instructions that, when executed by the processor, cause the apparatus to:

in response to determining that the report does not indicate the first network device, flag the first network device as a suspect device.

15. The apparatus of claim 13, wherein the memory stores one or more additional computer-executable instructions that, when executed by the processor, cause the apparatus to:

determine to retrieve the report from the second network device based on the second network device being indicated in the provisioning request.

16. The apparatus of claim 13, wherein the memory stores one or more additional computer-executable instructions that, when executed by the processor, cause the apparatus to:

determine an account associated with the first network device;

determine a plurality of network devices other than the first network device that are associated with the account;

receive, from the plurality of network devices, a plurality of reports indicating devices with which the plurality of network devices have exchanged credentials; and in response to determining that none of the plurality of reports indicate the first network device, flag the first network device as a suspect device.

17. The apparatus of claim 13, wherein the memory stores one or more additional computer-executable instructions that, when executed by the processor, cause the apparatus to:

determine an account associated with the first network device;

determine a plurality of network devices other than the first network device that are associated with the account;

determine a plurality of locations respectively for the plurality of network devices other than the first network device;

determine a location of the first network device based on the plurality of locations; and determine whether to grant the provisioning request based on the location of the first network device.

* * * * *

UNITED STATES PATENT AND TRADEMARK OFFICE
CERTIFICATE OF CORRECTION

PATENT NO. : 9,537,870 B2
APPLICATION NO. : 14/250437
DATED : January 3, 2017
INVENTOR(S) : Patel et al.

Page 1 of 1

It is certified that error appears in the above-identified patent and that said Letters Patent is hereby corrected as shown below:

In the Specification

Column 10, Detailed Description, Line 24:
Delete "111." and insert --211.--

Column 12, Detailed Description, Line 47:
Delete "304" and insert --314--

Column 14, Detailed Description, Line 2:
Delete "304" and insert --314--

Column 14, Detailed Description, Line 4:
Delete "304" and insert --314--

Column 15, Detailed Description, Line 30:
Delete "304" and insert --314--

Column 18, Detailed Description, Line 63:
Delete "302" and insert --304--

Column 18, Detailed Description, Line 65:
Delete "302's" and insert --304's--

Column 19, Detailed Description, Line 1:
Delete "304" and insert --314--

Signed and Sealed this
Second Day of April, 2019

Andrei Iancu
*Director of the United States Patent and Trademark Office*